F. SCHOENWOLF.
ELECTRICAL RECTIFIER AND POLE CHANGER.
APPLICATION FILED FEB. 16, 1917.
1,382,745.
Patented June 28, 1921.
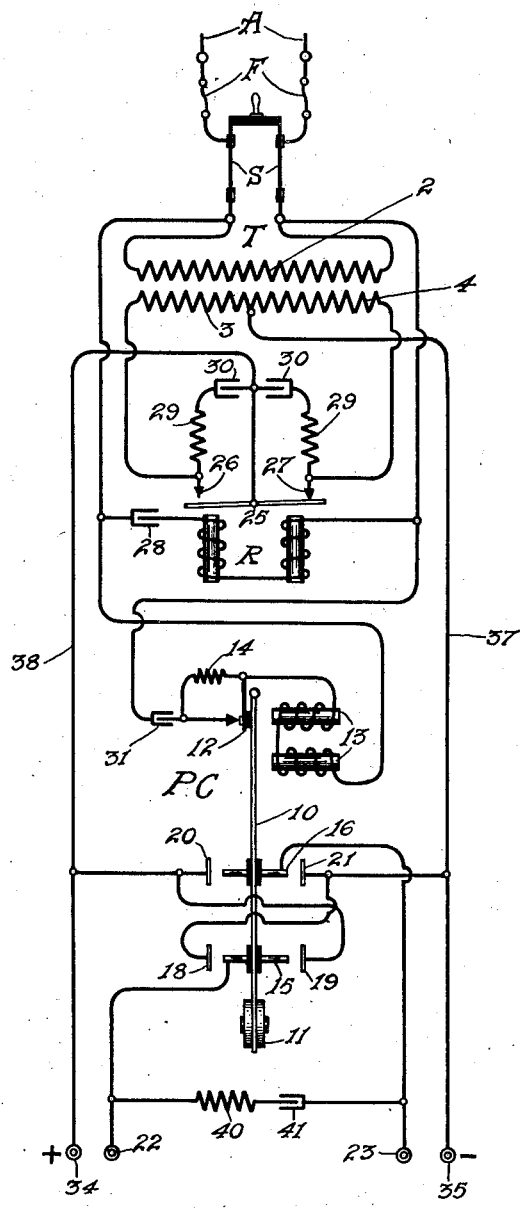
Witnesses:
G. Janochowski
Wm Berghahn
Inventor:
Fred Schoenwolf.
By Curtis B. Camp.
Attorney.

UNITED STATES PATENT OFFICE.

FRED SCHOENWOLF, OF CHICAGO, ILLINOIS, ASSIGNOR TO KELLOGG SWITCHBOARD & SUPPLY COMPANY, OF CHICAGO, ILLINOIS, A CORPORATION OF ILLINOIS.

ELECTRICAL RECTIFIER AND POLE-CHANGER.

1,382,745.  Specification of Letters Patent.  Patented June 28, 1921.

Application filed February 16, 1917. Serial No. 149,010.

*To all whom it may concern:*

Be it known that I, FRED SCHOENWOLF, a citizen of the United States of America, residing in Chicago, county of Cook, and State of Illinois, have invented certain new and useful Improvements in Electrical Rectifiers and Pole-Changers, of which the following is a specification.

My invention relates to current rectifiers and pole changers for use in automatically rectifying alternating current of a given frequency into uni-directional current and for then changing the uni-directional current back into alternating current of a frequency different than the frequency of the original current, for use, for example, in operating bells or ringers, such as the bells and ringers of a telephone system.

Various forms of current rectifiers or converters, such as mechanical, including both the vibrating and the rotary type, electrolytic or chemical, mercury arc, tungar, etc., have been used widely for rectifying or converting alternating current into uni-directional current for use in charging or floating storage batteries and for operating diversified forms of mechanical and electromagnetic devices. Likewise, diverse forms of pole changers, including both rotary and vibratory changers, have been commercially used for changing uni-directional current, supplied from either a storage battery or a rectifier, into alternating current for operating bells or ringers or other mechanical devices. In practically all of the common battery telephone systems in use, the source of operating current originates from a source of alternating current that is rectified and supplied to a set of accumulators to be used for operating purposes, and in connection with such a system pole changers or ringing machines are provided for changing the source of uni-directional current, which is either taken directly from the rectifier or from the accumulator which is being floated or charged, into a source of alternating current for operating the substation ringers and other bells.

Generally stated, the object of my invention is the provision of an improved device of the character described, provided with an improved circuit arrangement supplemented by a correct proportioning of the impedances, resistances and capacities to provide a highly efficient circuit arrangement to accomplish the purposes set forth.

The small mechanical rectifiers of the prior art using a polarized relay have not given satisfactory results due to the fact that it has been impossible, or practically so, to actuate the armature of the polarized relay in synchronism with the reversals or alternations of the alternating current, thereby causing a lag in the armature of the relay. One of the features of my invention is the provision of a circuit arrangement for the polarized relay having the necessary capacity and impedance to operate the polarized relay in synchronism with the current of the alternating source. In operating the armature of the relay in this manner, the uni-directional pulsating current produced comprises substantially the complete current wave for each pulsation. These and other features of my invention will be more clearly set forth in the ensuing specification and in the appended claims.

Referring to the accompanying drawing, I have shown diagrammatically the circuit arrangement of a current rectifier and a pole changer embodying the principles of my invention. The mechanical structure of the mechanism of both the polarized relay, which acts as a rectifier, and the pole changer may be of any of the well known or approved types, and as rectifiers and pole changers are well known in the art, it is thought unnecessary to further describe in detail the mechanical construction of the same.

At A, I show a pair of conductors connected to a source of alternating current, such as is used for lighting purposes and for operating motors, which generally has a voltage of 110 volts and a frequency of 60 cycles. At F, I show a pair of fuses for protecting the apparatus connected to the conductors A, and a single throw-switch S for connecting and disconnecting the said mechanism and the source of current. The transformer T has a primary winding 2 connected across the source of alternating current and a pair of secondary windings 3 and 4. A polarized relay R receives current from the secondary windings 3 and 4 of transformer T and rectifies or converts it into uni-directional current. A pole changer PC is also provided for changing the rectified current received from R back to alternating current of a different frequency for ringing bells or operating other mechanical devices.

The pole changer PC, as represented, comprises a tuned reed or pendulum 10 provided with a weighted member 11 adapted to be adjusted so that the frequency of the vibrating reed may be readily varied. Attached to the member 10 is a movable contact 12 which operates to include a high resistance winding 14 in the operating circuit of vibratory magnets 13 to decrease the current flow through said magnets 13 sufficiently to permit them to deënergize and again close contacts 12 to cause said magnets 13 to energize. The magnets 13 provide motor power to keep the tuned reed oscillating at a predetermined frequency as long as its local operating circuit is closed. The magnets 13 of the pole changer are connected directly across the source of alternating current and by arranging the condenser 31 and the high resistance 14 in its operating circuit in the manner shown, I find that the magnets 13 can be operated with practically no spark whatever at contact 12.

Insulatingly attached to the reed or pendulum 10 is a pair of movable contacts 15 and 16 for coöperating with stationary contacts 18, 19 and 20, 21, respectively, for sending impulses of the uni-directional current to the terminals 22, 23, thereby providing a source of alternating current of a frequency suitable for use in telephone exchanges to operate the bells or ringers of the substation equipment. The polarized relay or rectifier R, which has its operating magnets connected directly across the source of alternating current, includes an armature 25 for alternately contacting with contacts 26, 27, in synchronism with the reversals or alternations of the alternating current. As is well known, the impedance of the magnets of relay R causes a lag in the current that passes through them thereby causing a lag in the operation of its armature 25, placing it out of step to a certain degree with the reversals of the alternating current. To overcome the lag of relay R and to place it in step with the phase of the alternating current, I have reduced the impedance of the magnets as low as practical and have inserted a condenser 28 is circuit therewith of a capacity sufficient to neutralize the effect of the impedance of the magnets of relay R, thereby causing its armature to operate in synchronism with the alternating current. I bridge a resistance 29 and a condenser 30 around the contacts 26 and 27 of the relay R to decrease the spark caused by the breaking of these contacts by the magnets of the polarized rectifier R.

A resistance 40 and a condenser 41 is bridged across the terminals 22 and 23 of the source of ringing current to reduce the spark at the contacts of the pole changer. The terminals 34 and 35 are connected directly to the rectified uni-directional current and may be used for any desirable purpose.

Having described in general the apparatus embodied in my invention, I will now describe more in detail its operation.

When the switch S is closed, a local operating circuit is closed through the magnets of polarized relay R which operates to vibrate its armature 25 in synchronism with the alternations or reversals of the alternating current connected to the conductors A. A further result due to the closure of switch S is the connection of the primary winding 2 of the transformer T across the source of alternating current. Assuming that an impulse of one polarity is traversing the winding 2 of the transformer T in one direction, from left to right, and that the armature of relay R is in the position shown in the drawings, an impulse of current will be induced in the secondary windings 3 and 4 in an opposite direction from right to left. The impulse of current will thus flow from the secondary winding 4 to terminal 34 through contact 27 and armature 25 of relay R over conductor 38 to said terminal, and from terminal 35. Now, when an impulse of the opposite polarity is sent through the primary winding 2 of the transformer, an impulse will be induced in the secondary winding 3 in the opposite direction, from left to right. The impulse will flow from the secondary winding 3 through contact 26 and armature 25 of relay R over conductor 38 to terminal 34, and from terminal 35, thus causing a uni-directional flow of current to terminal 35 of one polarity, and a uni-directional flow of pulsating current to terminal 34 of the opposite polarity.

At the same time that switch S bridges the source of alternating current across the primary winding of the transformer T and through the magnets of polarized relay R, it also closes a circuit from one conductor A through the magnets 13 of the pole changer PC, contact 12, and condenser 31 to the opposite conductor A. The magnet 13 energizing opens its contact 12 and connects in series with the magnet 13, the high resistance 14, thereby diminishing the current flow through the magnets 13 and causing them to release the pendulum 10, thereby allowing the pendulum to swing back to normal position and close its contact 12, shunting the resistance 14 and permitting sufficient current to flow through the magnets 13 to again operatively energize the magnets 13, causing them to vibrate the tuned reed 10 at the predetermined frequency.

Assuming now that the magnets 13 have drawn the pendulum to the right until movable contacts 15 and 16 engage stationary contacts 19 and 21, respectively, an impulse of current will be sent from conductor 37 through closed contacts 21 and 16 to terminal 23 of one polarity and an impulse will be sent from conductor 38 through closed contacts 19 and 15 to terminal 22 of the opposite polarity. Now assuming that the pendulum 10 has moved to its alternate position, an impulse of current of a polarity opposite to that transmitted to terminal 23 at the time that the pendulum was in its prior position will be transmitted to terminal 23 from conductor 38, through closed contacts 20 and 16 to said terminal 23. Likewise, an impulse of polarity opposite to that transmitted when the pendulum 10 was in its prior position will be transmitted to terminal 22 from conductor 37, through closed contacts 18 and 15 to said terminal 22, thereby furnishing impulses of opposite polarity to terminals 22 and 23 of the desired frequency for actuating telephone bells or other electro-mechanical devices.

From the foregoing, it will be seen that I have provided a very simple, yet efficient, combined rectifier and pole changer for use in converting alternating current of one frequency into alternating current of another frequency suitable for ringing telephone bells. Also, that I have so arranged the impedance and capacity of the circuit of the polarized rectifier to operate it in synchronism with the reversals of currents in the supply main.

While I have shown one specific circuit arrangement, yet it is to be understood that I do not wish to limit myself to the same, as changes and modifications will readily suggest themselves to one skilled in the art. Therefore, I wish to cover all that comes within the spirit and scope of the appended claims.

What I claim as new and desire to secure by United States Letters Patent is:

1. A device of the character described including a source of alternating current, a transformer having its primary winding bridged across said source of current, a rectifier provided with a pair of magnets connected across said source of current, a pair of secondary windings for said transformer connected to contacts of said rectifier, a condenser in circuit with the magnets of said rectifier to neutralize their impedance to permit the armature of said rectifier to vibrate in synchronism with the alternating current, a supply circuit, a pole changer having movable switching means connected to said supply circuit, relatively stationary switching means for said pole changer connected to said secondary windings and to the armature of said rectifier, and a resistance winding and a condenser connected from said armature to each of said rectifier contacts.

2. A device of the character described including a source of alternating current, a transformer having its primary winding bridged across said source of current, a rectifier provided with a pair of magnets connected across said source of current, a pair of secondary windings for said transformer connected to contacts of said rectifier, a condenser in circuit with the magnets of said rectifier to neutralize their impedance to permit the armature of said rectifier to vibrate in synchronism with the alternating current, a supply circuit, a pole changer having vibratory switching means connected to said supply circuit, relatively stationary switching means for said pole changer connected to said secondary windings and to the armature of said rectifier, a resistance winding and a condenser connected from said armature to each of said rectifier contacts, operating magnets for said pole changer connected directly across said source of alternating current, and a resistance winding and a condenser connected in circuit with said operating magnets.

3. A device of the character described including a source of alternating current, a transformer having its primary winding bridged across said source of current, a rectifier provided with a pair of magnets connected across said source of current, a pair of secondary windings for said transformer connected to contacts of said rectifier, a condenser in circuit with the magnets of said rectifier to neutralize their impedance to permit the armature of said rectifier to vibrate in synchronism with the alternating current, a supply circuit, a pole changer having movable switching means connected to said supply circuit, relatively stationary switching means for said pole changer connected to said secondary windings and to the armature of said rectifier, a resistance winding and a condenser connected from said armature to each of said rectifier contacts, operating magnets for said pole changer connected directly across said source of alternating current, a resistance winding and a condenser connected in circuit with said operating magnets and a resistance winding and a condenser connected across said supply circuit to decrease the spark of said switching means.

4. A device of the character described including a source of alternating current, a transformer having one of its windings bridged across said source of current, a rectifying device provided with a pair of magnets connected across said source of current, movable contacts and relatively stationary contacts for said rectifying device, a secondary winding for said transformer connected to the said relatively stationary contacts of said rectifying device, a supply circuit, a pole changer having movable switching contacts and relatively stationary contacts, a conductor connecting the middle point of the secondary winding to certain of the stationary contacts of said pole changer, a second conductor connecting other of said stationary contacts of the pole changer to the movable contact of the rectifier, a magnet for operating said pole changer bridged across said supply source of current, and conductors extending from the movable switching contacts of said pole changer to the supply circuit.

5. A device of the character described including a source of alternating current, a vibratory rectifier having relatively stationary and movable contacts, a vibratory pole changer having relatively stationary and movable contacts, circuit connections connecting the primary winding of said transformer, the motor device of said rectifier and the motor device of said pole changer being bridged across the source of alternating current, whereby the rectifying device and pole changer are operated by the supply source of current, circuit conductors connecting the stationary contacts of the rectifying device to the secondary winding of the transformer, other circuit conductors connecting the middle point of the secondary winding of the transformer and the movable contact of the rectifying device to the relatively stationary contacts of the pole changer whereby rectified current is supplied by the rectifying device to the stationary contacts of the pole changer, a supply circuit supplying alternating current of a different frequency than the frequency of the source of alternating current, conductors connecting the movable contacts of said pole changer to said supply circuit, a resistance and a condenser bridged across from the stationary contacts of the rectifier to the movable contact thereof, and a resistance and a condenser bridged across the interrupter contacts in the circuit of the motor device of the pole changer.

6. A device of the character described including a source of alternating current, a vibratory rectifier having relatively stationary and movable contacts, a vibratory pole changer having relatively stationary and movable contacts, circuit connections connecting the primary winding of said transformer, the motor device of said rectifier and the motor device of said pole changer being bridged across the source of alternating current, whereby the rectifying device and pole changer are operated by the supply source of current, circuit conductors connecting the stationary contacts of the rectifying device to the secondary winding of the transformer, other circuit conductors connecting the middle point of the secondary winding of the transformer and the movable contact of the rectifying device to the relatively stationary contacts of the pole changer whereby rectified current is supplied by the rectifying device to the stationary contacts of the pole changer, a supply circuit supplying alternating current of a different frequency than the frequency of the source of alternating current, conductors connecting the movable contacts of said pole changer to said supply circuit, a resistance and a condenser bridged across from the stationary contacts of the rectifier to the movable contact thereof, a resistance and a condenser bridged across the interrupter contacts in the circuit of the motor device of the pole changer, a condenser in the circuit of the motor device of the rectifier to neutralize the impedance of the electromagnet of the rectifier to permit the armature of the same to vibrate in synchronism with the source of alternating current, and a resistance and condenser bridged across the supply circuit.

Signed by me at Chicago, in the county of Cook, and State of Illinois, in the presence of two witnesses.

FRED SCHOENWOLF.

Witnesses:
G. YANSEBOWSKI,
WM. BEBGHAHN.